US010948285B2

(12) United States Patent
Becker et al.

(10) Patent No.: US 10,948,285 B2
(45) Date of Patent: Mar. 16, 2021

(54) THREE-DIMENSIONAL MEASUREMENT DEVICE MOBILE GEOMETRY VERIFICATION

(71) Applicant: FARO Technologies, Inc., Lake Mary, FL (US)

(72) Inventors: Reinhard Becker, Ludwigsburg (DE); Gerrit Hillebrand, Waiblingen (DE); Martin Ossig, Tamm (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 282 days.

(21) Appl. No.: 16/037,674

(22) Filed: Jul. 17, 2018

(65) Prior Publication Data

US 2019/0033064 A1     Jan. 31, 2019

Related U.S. Application Data

(60) Provisional application No. 62/538,105, filed on Jul. 28, 2017.

(51) Int. Cl.
| | |
|---|---|
| *G01B 11/25* | (2006.01) |
| *G01B 11/00* | (2006.01) |
| *G01B 5/008* | (2006.01) |
| *H04N 13/254* | (2018.01) |
| *H04N 13/239* | (2018.01) |

(Continued)

(52) U.S. Cl.
CPC .............. *G01B 11/25* (2013.01); *G01B 5/008* (2013.01); *G01B 11/005* (2013.01); *G06T 7/62* (2017.01);

(Continued)

(58) Field of Classification Search
CPC ...... G01B 11/25; G01B 11/005; G01B 5/008; G06T 7/62; G06T 2207/10152;

(Continued)

(56) References Cited

U.S. PATENT DOCUMENTS

| | | | |
|---|---|---|---|
| 7,047,151 B2 * | 5/2006 | Chang | .......... G06T 17/00 382/149 |
| 2010/0198565 A1 | 8/2010 | Jayaram et al. | |

(Continued)

FOREIGN PATENT DOCUMENTS

| | | |
|---|---|---|
| CN | 101626509 A | 1/2010 |
| DE | 102007059478 B4 | 6/2009 |

(Continued)

OTHER PUBLICATIONS

Extended European Search Report for Application No. 18185289.8 dated Oct. 24, 2018; 7 pgs.

(Continued)

*Primary Examiner* — Manuel L Barbee
(74) *Attorney, Agent, or Firm* — Cantor Colburn LLP

(57) ABSTRACT

A method and system for inspecting an object is provided. The system includes a measurement device that measures 3D coordinates of points on a surface of the object. A display is coupled to the device and is sized to be carried by an operator. One or more processors cooperate with the measurement device, to perform a method comprising: determining 3D coordinates of the points while the object is being measured; aligning an electronic model of the object to the points while the object is being measured; determining a variance between the electronic model and the points while the object is being measured; and displaying on the display an indicator when the variance exceeds a threshold while the object is being measured.

20 Claims, 11 Drawing Sheets

(51) Int. Cl.
*H04N 13/25* (2018.01)
*H04N 13/243* (2018.01)
*H04N 13/00* (2018.01)
*G06T 7/62* (2017.01)

(52) U.S. Cl.
CPC ........... *H04N 13/239* (2018.05); *H04N 13/25* (2018.05); *H04N 13/254* (2018.05); *G06T 2207/10152* (2013.01); *H04N 13/243* (2018.05); *H04N 2013/0081* (2013.01)

(58) Field of Classification Search
CPC .... H04N 13/254; H04N 13/239; H04N 13/25; H04N 13/243; H04N 2013/0081
See application file for complete search history.

(56) References Cited

U.S. PATENT DOCUMENTS

2011/0173829 A1* 7/2011 Pettersson .............. G01C 15/02
33/503

2016/0069670 A1* 3/2016 Ruhland .............. G01B 11/002
356/610
2016/0175955 A1* 6/2016 Ferry ................... G05B 19/182
700/110
2017/0010087 A1 1/2017 Polidor et al.
2017/0054965 A1 2/2017 Raab et al.

FOREIGN PATENT DOCUMENTS

| | | |
|---|---|---|
| EP | 2071510 A3 | 6/2009 |
| JP | 201760574 A | 9/2017 |
| WO | 2016040229 A1 | 3/2016 |

OTHER PUBLICATIONS

CAD part inspection comparison software / 3D—Focus Inspection—Nikon Metrology, retreived Nov. 1, 2017 from Internet http://www.directindustry.com/prod/nikon-metrology/product-21023-608152.html, Copyright 2017, 18 pgs.

* cited by examiner

THREE-DIMENSIONAL MEASUREMENT DEVICE MOBILE GEOMETRY VERIFICATION

CROSS REFERENCE TO RELATED APPLICATIONS

This application claims the benefit of U.S. Provisional Application Ser. No. 62/538,105, filed Jul. 28, 2017, the entire disclosure of which is incorporated herein by reference.

BACKGROUND

The subject matter disclosed herein relates to a three-dimensional (3D) measurement device, and in particular to a 3D measurement device operable to allow verification of geometry on a mobile scanner during the scanning process.

A 3D imager is a portable device includes a projector that projects light patterns on the surface of an object to be scanned. Typically the projector emits a coded or uncoded pattern. One (or more) cameras, having a predetermined positions and alignment relative to the projector, which record images of the light pattern on the surface of an object. The three-dimensional coordinates of elements in the light pattern can be determined by trigonometric methods, such as by using epipolar geometry. Other types of noncontact devices may also be used to measure 3D coordinates, such as those that use time of flight techniques (e.g. laser trackers, laser scanners or time of flight cameras) for measuring the amount of time it takes for light to travel to the surface and return to the device.

The measured 3D geometry may be used in some applications to verify the dimensional accuracy of the scanned object. Due to the computational intensive nature of this is done in a post-processing environment after the object has been scanned. This verification check allows the operator to determine whether the object is within specification for example. However, the operator needs to complete the scan and then align the point cloud with a model such as a computer-aided-design model for example. A time consuming process.

Accordingly, while existing 3D imagers are suitable for their intended purpose the need for improvement remains, particularly in providing a system for verifying dimensions of a scanned object while the scan is in progress. Still further improvements are desired in providing a system that can verify dimensions during an assembly, set up or construction of an object when dimensional changes may be readily performed or corrected.

BRIEF DESCRIPTION

According to one aspect of the disclosure, a system for inspecting an object. The system includes a measurement device operable to measure three dimensional coordinates of one or more points on a surface of the object. A display is operably coupled to the measurement device, the display being sized to be carried by an operator with the measurement device. One or more processors are operably coupled to the measurement device, the one or more processors operable to execute computer instructions when executed on the one or more processors to perform a method comprising: determining three-dimensional coordinates of the one or more points while the object is being measured; aligning an electronic model of the object to the one or more points while the object is being measured; determining a variance between the electronic model and the one or more points while the object is being measured; and displaying on the display an indicator when the variance exceeds a threshold while the object is being measured.

According to another aspect of the disclosure, a method for inspecting an object is provided. The method includes measuring locations of one or more points on a surface of an object with a measurement device. Three-dimensional coordinates of the one or more points are determined with the measurement device. An electronic model of the object is received by the measurement device. The electronic model of the object is aligned, with the measurement device, to the one or more points while the object is being measured. A variance between the electronic model and the one or more points is determined, with the measurement device, while the object is being measured. A display displays an indicator when the variance exceeds a threshold while the object is being measured.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the invention provide for a three-dimensional (3D) measurement device that displays an augmented reality image on a point cloud during a scanning operation. Embodiments further provide for a 3D measurement device the displays an electronic model, such as a computer-aideddesign (CAD) model for example, overlaid on a point cloud during the scanning operation. Embodiments disclosed herein further provide for determining variations between the electronic model and the point cloud during the scanning operation.

Figure 1:
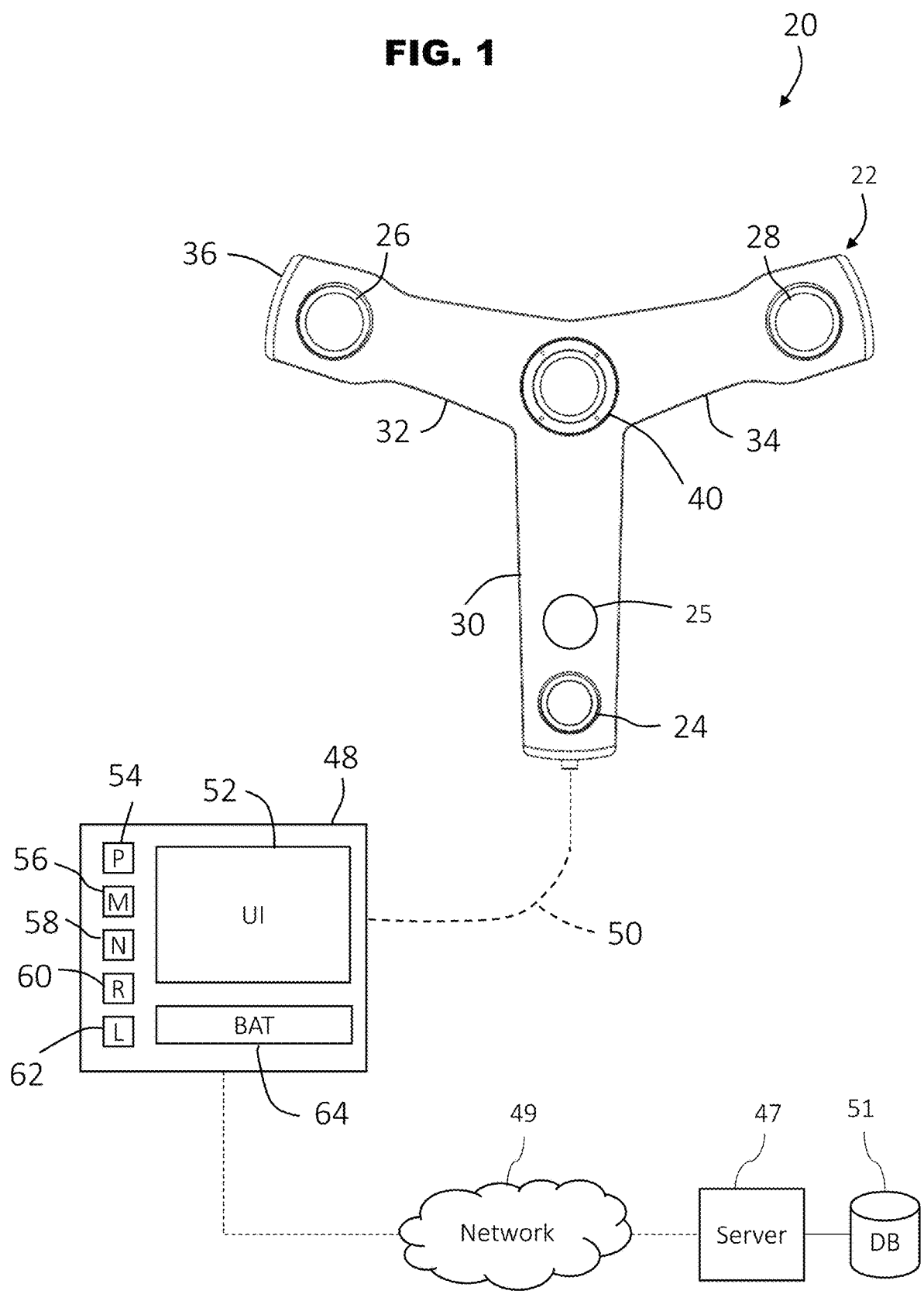
FIG. 1 is a view of a 3D imager system in accordance with one or more embodiments of the invention.

Referring now to FIG. 1, a measurement device, such as 3D imager system 20, is shown for determining 3D coordinates of surfaces in an environment. The system 20 includes an image scanner 22 having a projector 24, a first camera 26 and a second camera 28. In the exemplary embodiment, the projector 24, and cameras 26, 28 are each disposed in separate arms 30, 32, 34 of a housing 36 respectively. A color camera 40 may be centrally disposed on the housing 36 between the arms 30, 32, 34. In the exemplary embodiment, the color camera 40 has a field of view that acquires images, including color information, of the environment being scanned. In an embodiment, the color camera 40 may be used to provide color (texture) information for incorporation into the 3D image. In some embodiments, the camera 40 acquires a video image may be used to register multiple 3D images through the use of videogrammetry. In an embodiment, the registration of multiple 3D images is performed using natural features of the object or the environment being scanned. The color camera 40 is sometimes referred to as an RGB camera.

As discussed in more detail herein, in an embodiment the projector 24 projects a pattern of light onto a surface in the environment. As used herein, the term "projector" is defined to generally refer to a device for producing a pattern. The generation of the pattern can take place by means of deflecting methods, such as generation by means of diffractive optical elements or micro-lenses (or single lasers), or by shading methods, for example the production by means of shutters, transparencies (as they would be used in a transparency projector) and other masks. The deflecting methods have the advantage of less light getting lost and consequently a higher intensity being available.

The cameras 26, 28 acquire images of the pattern and in some instances able to determine the 3D coordinates of points on the surface using trigonometric principles, e.g. epipolar geometry. In an embodiment, the cameras 26, 28 are sensitive to monochromatic light, such as light in the infrared (IR) spectrum.

It should be appreciated that while the illustrated embodiments show and describe the device that determines 3D coordinates as being an image scanner, this is for exemplary purposes and the claimed invention should not be so limited. In other embodiments, devices that use other means for measuring 3D coordinates may also be used, such as non-contact measurement devices that include, but are not limited to, a laser scanner device that uses time-of-flight to determine the distance to the surface, a laser tracker and a laser line probe for example. In other embodiments, the device may be a contact-type measurement device, such as but not limited to an articulated arm coordinate measurement machine (AACMM) for example.

In one embodiment, the system 20 may include a second projector 25. As discussed in more detail herein, the second projector 25 may be used to project light onto the object to show the operator where variances are located or the location of another point of interest. In an embodiment, the second projector 25 may be any suitable projector that emits light in the visible light spectrum. In an embodiment, the second projector 25 may be a liquid crystal diode (LCD), a digital micromirror device (DMD), a digital light processing device (DLP) or a liquid crystal on silicon device (LCoS) for example. In still other embodiments, the second projector 25 may include movable mirrors, such as galvanometers for example, that allow the steering of the emitted light. The light source of the second projector 25 may be a laser, a light emitting diode (LED) or a superluminescent diode (SLED or SLD). In an embodiment, the projected light is steerable, meaning the direction of the light may be changed, this would allow for example for the light to remain in the same position on the object as the system 20 is moved relative to the object. In an embodiment, the projected light may be moved between multiple points of interest in a sequential manner. In an embodiment, the light may be moved based at least in part on object points of interest that have characteristic variances from expected values. In an embodiment, the movement of the projected light may be in response to an action (e.g. the actuating of a user interface) by the operator. In still another embodiment, the second projector 25 may be external to (e.g. separate and apart from) the system 20.

A controller 48 is coupled for communication to the projector 24, cameras 26, 28, 40 and optionally second projector 25. The connection may be a wired connection 50 or a wireless connection. The controller 48 is a suitable electronic device capable of accepting data and instructions, executing the instructions to process the data, and presenting the results. Controller 48 may accept instructions through user interface 52, or through other means such as but not limited to electronic data card, voice activation means, manually-operable selection and control means, radiated wavelength and electronic or electrical transfer. In one embodiment, the user interface may include a display or graphical interface that is wearable by the operator, such as a head mounted display that includes, but is not limited to a display incorporated into glasses. The controller 48 is a portable device that is used in conjunction with the image scanner 22. As will be discussed in more detail herein, the image scanner 22 acquires data and the controller 48 determines the 3D coordinates of points on the surfaces of the object being scanned. These 3D coordinates are used to form a point cloud that is displayed on the user interface 52.

Controller 48 uses signals act as input to various processes for controlling the system 20. The digital signals represent one or more system 20 data including but not limited to images acquired by cameras 26, 28, 40, temperature, ambient light levels, operator inputs via user interface 52 and the like.

Controller 48 is operably coupled with one or more components of system 20 by data transmission media 50. Data transmission media 50 includes, but is not limited to, twisted pair wiring, coaxial cable, and fiber optic cable. Data transmission media 50 also includes, but is not limited to, wireless, radio and infrared signal transmission systems. Controller 48 is configured to provide operating signals to these components and to receive data from these components via data transmission media 50.

In general, controller 48 accepts data from cameras 26, 28, 40, projector 24 and a light source, and is given certain instructions for the purpose of determining the 3D coordinates of points on surfaces being scanned. The controller 48 may monitor or compare the operational parameters to predetermined variances and if the predetermined variance is exceeded, generates a signal that may be used to indicate an alarm to an operator or to a remote computer via a network. Additionally, the signal may initiate other control methods that adapt the operation of the system 20 such as changing the operational state of cameras 26, 28, 40, projector 24, second projector 25, or a light source (not shown) to compensate for the out of variance operating parameter.

Still other control methods may compare an electronic model to the point cloud against to predetermined variances and if the predetermined variance is exceeded, displaying an indicator of the variance on the user interface 52. In an embodiment, the displaying of the indicator occurs concurrently with the measurement of the object. In an embodiment, the point cloud is overlaid with an electronic model on the user interface 52 to allow viewing by the operator.

The data received from cameras 26, 28, 40 may be displayed on a user interface 52. The user interface 52 may be an LED (light-emitting diode) display, an LCD (liquid-crystal diode) display, a CRT (cathode ray tube) display, a touch-screen display or the like. A keypad may also be coupled to the user interface for providing data input to controller 48.

In addition to being coupled to one or more components within system 20, controller 48 may also be coupled to external computer networks such as a local area network (LAN) and the Internet. A LAN interconnects one or more remote computers, which are configured to communicate with controller 48 using a well-known computer communications protocol such as TCP/IP (Transmission Control Protocol/Internet(ˆ) Protocol), RS-232, ModBus, and the like. Additional systems 20 may also be connected to LAN with the controllers 48 in each of these systems 20 being configured to send and receive data to and from remote computers and other systems 20. The LAN is connected to the Internet. This connection allows controller 48 to communicate with one or more remote computers connected to the Internet.

Controller 48 includes a processor 54 coupled to a random access memory (RAM) device 56, a non-volatile memory (NVM) device 58, a read-only memory (ROM) device 60, one or more input/output (I/O) controllers, and a LAN interface device 62 via a data communications bus.

Figure 11:
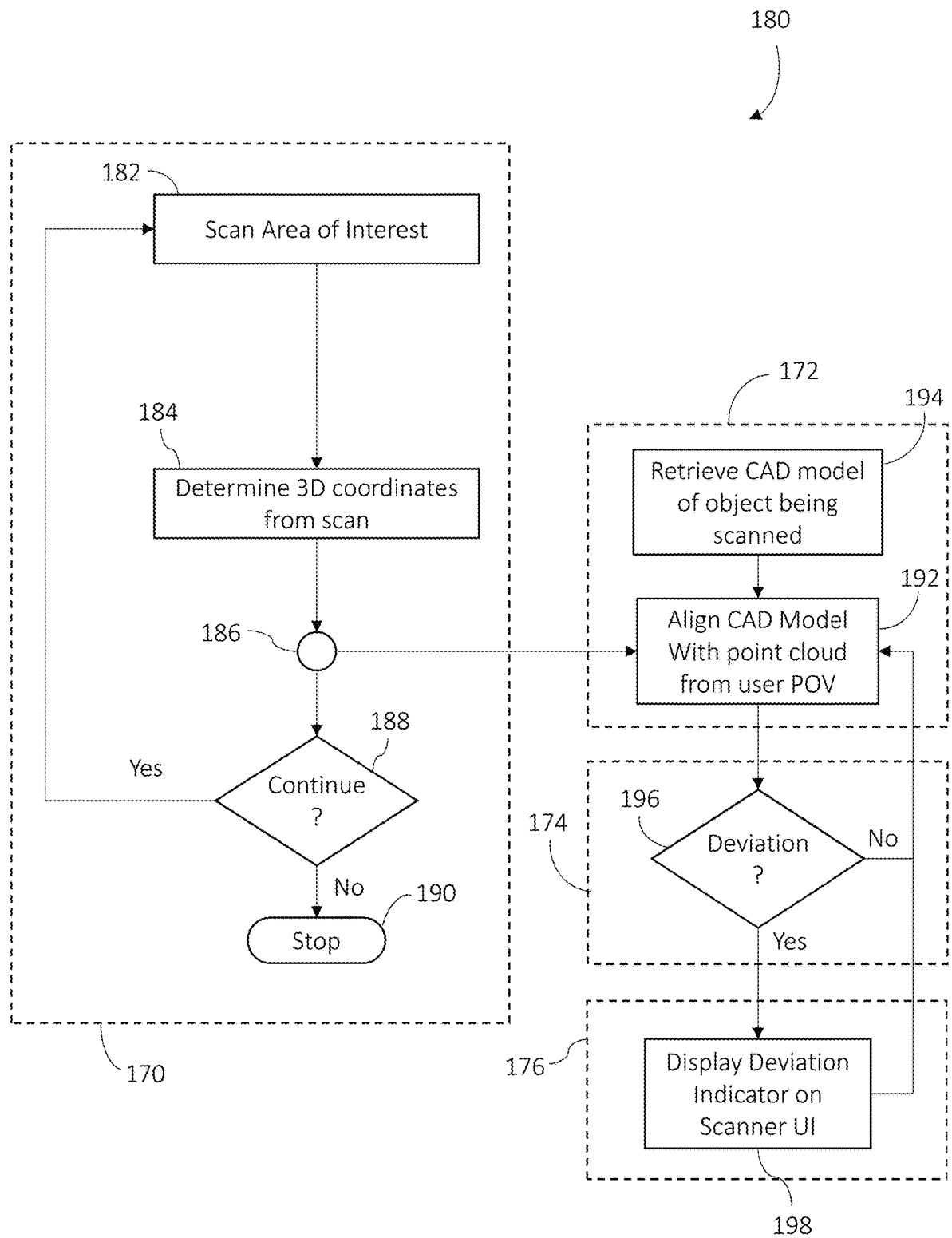
FIG. 11 is a flow diagram of a method of simultaneously displaying an electronic model and a point cloud during a scanning operation in accordance with an embodiment.

LAN interface device 62 provides for communication between controller 48 and a network in a data communications protocol supported by the network. ROM device 60 stores an application code, e.g., main functionality firmware, including initializing parameters, and boot code, for processor 54. Application code also includes program instructions as shown in FIG. 11 for causing processor 54 to execute any system 20 operation control methods, including starting and stopping operation, changing operational states of projector 24, monitoring predetermined operating parameters, and generation of alarms. In an embodiment, the application code creates an onboard telemetry system may be used to transmit operating information between the system 20 and one or more remote computers 47 or other computer nodes via a network 49. The information to be exchanged remote computers and the controller 48 include but are not limited to 3D coordinate data and images. In an embodiment, data, such as an electronic model for example, may be retrieved from a database 51 connected to the remote computer 47 and transmitted via the network 49 to the controller 48.

NVM device 58 is any form of non-volatile memory such as an EPROM (Erasable Programmable Read Only Memory) chip, a disk drive, or the like. Stored in NVM device 58 are various operational parameters for the application code. The various operational parameters can be input to NVM device 58 either locally, using a user interface 52 or remote computer, or remotely via the Internet using a remote computer. It will be recognized that application code can be stored in NVM device 58 rather than ROM device 60.

Controller 48 includes operation control methods embodied in application code such as that shown in FIG. 11. These methods are embodied in computer instructions written to be executed by processor 54, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, C#, Objective-C, Java, Javascript ALGOL (algorithmic language), BASIC (beginners all-purpose symbolic instruction code), visual BASIC, ActiveX, HTML (HyperText Markup Language), Python, Ruby and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

In an embodiment, the controller 48 further includes an energy source, such as battery 64. The battery 64 may be an electrochemical device that provides electrical power for the controller 48. In an embodiment, the battery 64 may also provide electrical power to the cameras 26, 28, the projector 24 and the high quality camera 40. In some embodiments, the battery 64 may be separate from the controller (e.g. a battery pack). In an embodiment, a second battery (not shown) may be disposed in the housing 36 to provide electrical power to the cameras 26, 28, 40 and projector 24. In still further embodiments, the light source 42 may have a separate energy source (e.g. a battery pack).

It should be appreciated that while the controller 48 is illustrated as being separate from the housing 36, this is for exemplary purposes and the claimed invention should not be so limited. In other embodiments, the controller 48 is integrated into the housing 36.

Figure 2:
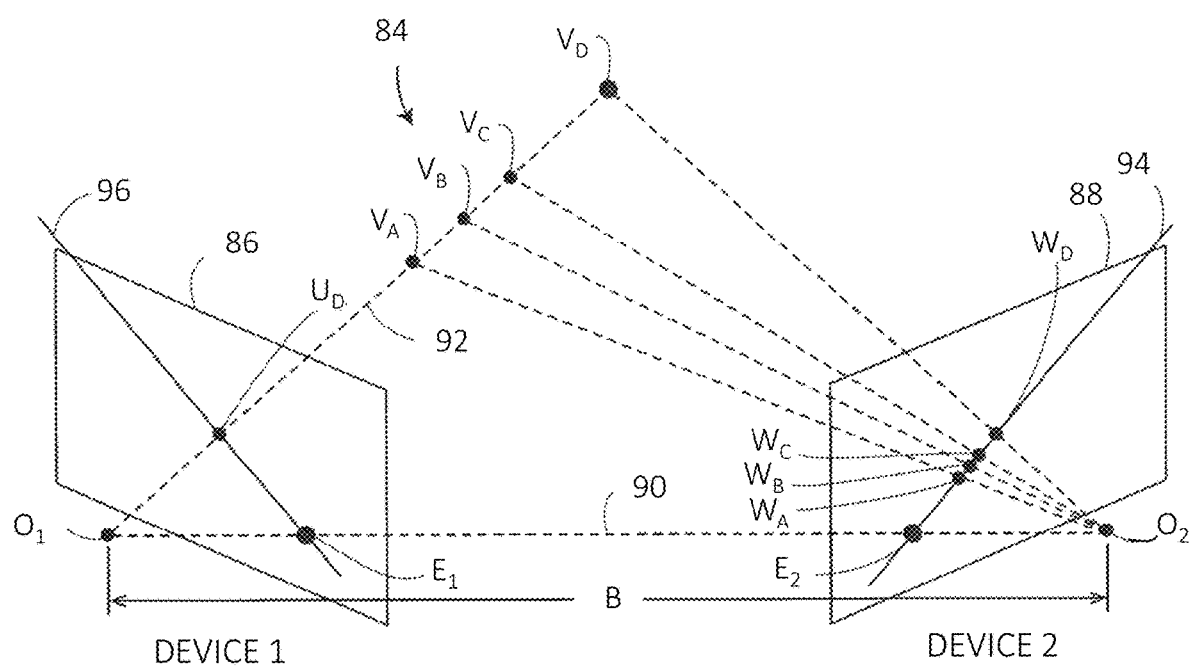
FIG. 2 and FIG. 3 are schematic illustrations of the principle of operation of the 3D imager of FIG. 1.
Figure 3:
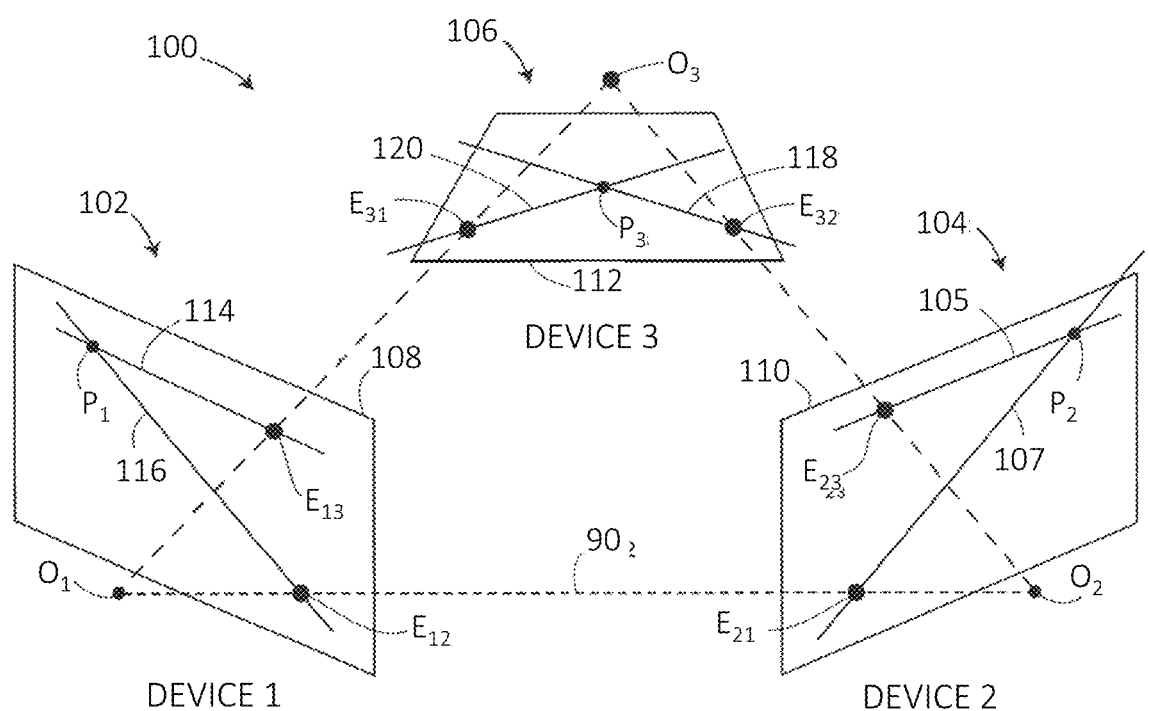

Referring now to FIG. 2 and FIG. 3, an embodiment is shown of a method of determining the 3D coordinates of the data points in the point cloud using the image scanner 22. In the illustrated embodiment, the projector 24 and cameras 26, 28 are arranged spaced apart in a triangular arrangement where the relative distances and positions between the components is known. The triangular arrangement is advantageous in providing information beyond that available for two cameras and a projector arranged in a straight line or from a system with a projector and a single camera. The additional information may be understood in reference to FIG. 2, which explain the concept of epipolar constraints, and FIG. 3 that explains how epipolar constraints are advantageously applied to the triangular arrangement of the system 20. In FIG. 2, a 3D triangulation instrument 84 includes a device 1 and a device 2 on the left and right sides as view from the viewpoint of FIG. 4, respectively. Device 1 and device 2 may be two cameras or device 1 and device 2 may be one camera and one projector. Each of the two devices, whether a camera or a projector, has a perspective center, $O_1$ and $O_2$, and a representative plane, 86 or 88. The perspective centers are separated by a baseline distance B, which is the length of the line 90. The perspective centers $O_1$, $O_2$ are points through which rays of light may be considered to travel, either to or from a point on a surface in the area of the environment being scanned. These rays of light either emerge from an illuminated projector pattern or impinge on a photosensitive array. The placement of the reference planes 86, 88 is applied in FIG. 2, which shows the reference planes 86, 88 between the object point and the perspective centers $O_1$, $O_2$.

In FIG. 2, for the reference plane 86 angled toward the perspective center $O_2$ and the reference plane 88 angled toward the perspective center $O_1$, a line 90 drawn between the perspective centers $O_1$ and $O_2$ crosses the planes 86 and 88 at the epipole points $E_1$, $E_2$, respectively. Consider a point $U_D$ on the plane 86. If device 1 is a camera, it is known that an object point that produces the point $U_D$ on the image lies on the line 92. The object point might be, for example, one of the points $V_A$, $V_B$, $V_C$, or $V_D$. These four object points correspond to the points $W_A$, $W_B$, $W_C$, $W_D$, respectively, on the reference plane 88 of device 2. This is true whether device 2 is a camera or a projector. It is also true that the four points lie on a straight line 94 in the plane 88. This line, which is the line of intersection of the reference plane 88 with the plane of $O_1$-$O_2$-$U_D$, is referred to as the epipolar line 94. It follows that any epipolar line on the reference plane 88 passes through the epipole $E_2$. Just as there is an epipolar line on the reference plane of device 2 for any point on the reference plane of device 1, there is also an epipolar line 96 on the reference plane of device 1 for any point on the reference plane of device 2.

FIG. 3 illustrates the epipolar relationships for a 3D imager 100 corresponding to triangulation instrument 84 of FIG. 2 in which two cameras and one projector are arranged in a triangular pattern. In general, the device 1, device 2, and device 3 may be any combination of cameras and projectors as long as at least one of the devices is a camera. Each of the three devices 102, 104, 106 has a perspective center $O_1$, $O_2$, $O_3$, respectively, and a reference plane 108, 110, and 112, respectively. Each pair of devices has a pair of epipoles. Device 1 and device 2 have epipoles $E_{12}$, $E_{21}$ on the planes 108, 110, respectively. Device 1 and device 3 have epipoles $E_{13}$, $E_{31}$, respectively on the planes 108, 112, respectively. Device 2 and device 3 have epipoles $E_{23}$, $E_{32}$ on the planes 110, 112, respectively. In other words, each reference plane includes two epipoles. The reference plane for device 1 includes epipoles $E_{12}$ and $E_{13}$. The reference plane for device 2 includes epipoles $E_{21}$ and $E_{23}$. The reference plane for device 3 includes epipoles $E_{31}$ and $E_{32}$.

Consider the embodiment of FIG. 3 in which device 3 is a projector, device 1 is a first camera, and device 2 is a second camera. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 108 to obtain the epipolar line 114. Intersect the plane $P_2$-$E_{21}$-$E_{12}$ to obtain the epipolar line 116. If the image point $P_1$ has been determined consistently, the observed image point $P_1$ will lie on the intersection of the determined epipolar line 114 and line 116.

To check the consistency of the image point $P_2$, intersect the plane $P_3$-$E_{32}$-$E_{23}$ with the reference plane 110 to obtain the epipolar line 105. Intersect the plane $P_1$-$E_{12}$-$E_{21}$ to obtain the epipolar line 107. If the image point $P_2$ has been determined consistently, the observed image point $P_2$ will lie on the intersection of the determined epipolar lines 107 and 105.

To check the consistency of the projection point $P_3$, intersect the plane $P_2$-$E_{23}$-$E_{32}$ with the reference plane 110 to obtain the epipolar line 118. Intersect the plane $P_1$-$E_{13}$-$E_{31}$ to obtain the epipolar line 120. If the projection point $P_3$ has been determined consistently, the projection point $P_3$ will lie on the intersection of the determined epipolar line 118 and line 120.

The redundancy of information provided by using a 3D imager 100 having a triangular arrangement of projector and cameras may be used to reduce measurement time, to identify errors, and to automatically update compensation/calibration parameters. It should be appreciated that based on the epipolar geometry relationships described herein, the distance from the image scanner 22 to points on the surface being scanned may be determined. By moving the image scanner 22, the determination of the pose/orientation of the image scanner, and a registration process the three dimensional coordinates of locations (point data) on a surface may be determined and the point cloud generated.

It should be appreciated that since the cameras 26, 28 are sensitive to monochromatic light (e.g. in the infrared spectrum), the measured 3D coordinate points do not include color or texture information. In an embodiment, as the 3D coordinates are measured and determined, the image scanner 22 also acquires color images of the scene being scanned with the color camera 40. In one embodiment, the color data from the images acquired by color camera 40 is merged with the measured 3D coordinate data. In order to obtain a 3D point cloud of the scanned object, each image shot/frame is registered, in other words the three-dimensional coordinates obtained in each image frame is inserted in a common coordinate system. Registration is possible, for example, by videogrammetry, i.e., for example, "structure from motion" (SFM) or "simultaneous localization and mapping" (SLAM). The natural texture of the scanned objects or environment can also be used for common points of reference, or a separate stationary pattern can be produced. The natural texture can be captured by the color camera 40 in addition to obtaining the color information. This allows the color information to be associated with each of the measured 3D coordinates. In one embodiment, the pose of the first color camera 40 is known in relation to the pose of the projector 24 and the cameras 26, 28 and since the characteristics/parameters of the color camera are known (e.g. focal length), the two-dimensional (2D) color data may be merged with the measured 3D coordinate data/points by projecting the rays that enter the 2D color camera 40 onto the measured 3D coordinate data/points.

Figure 4:
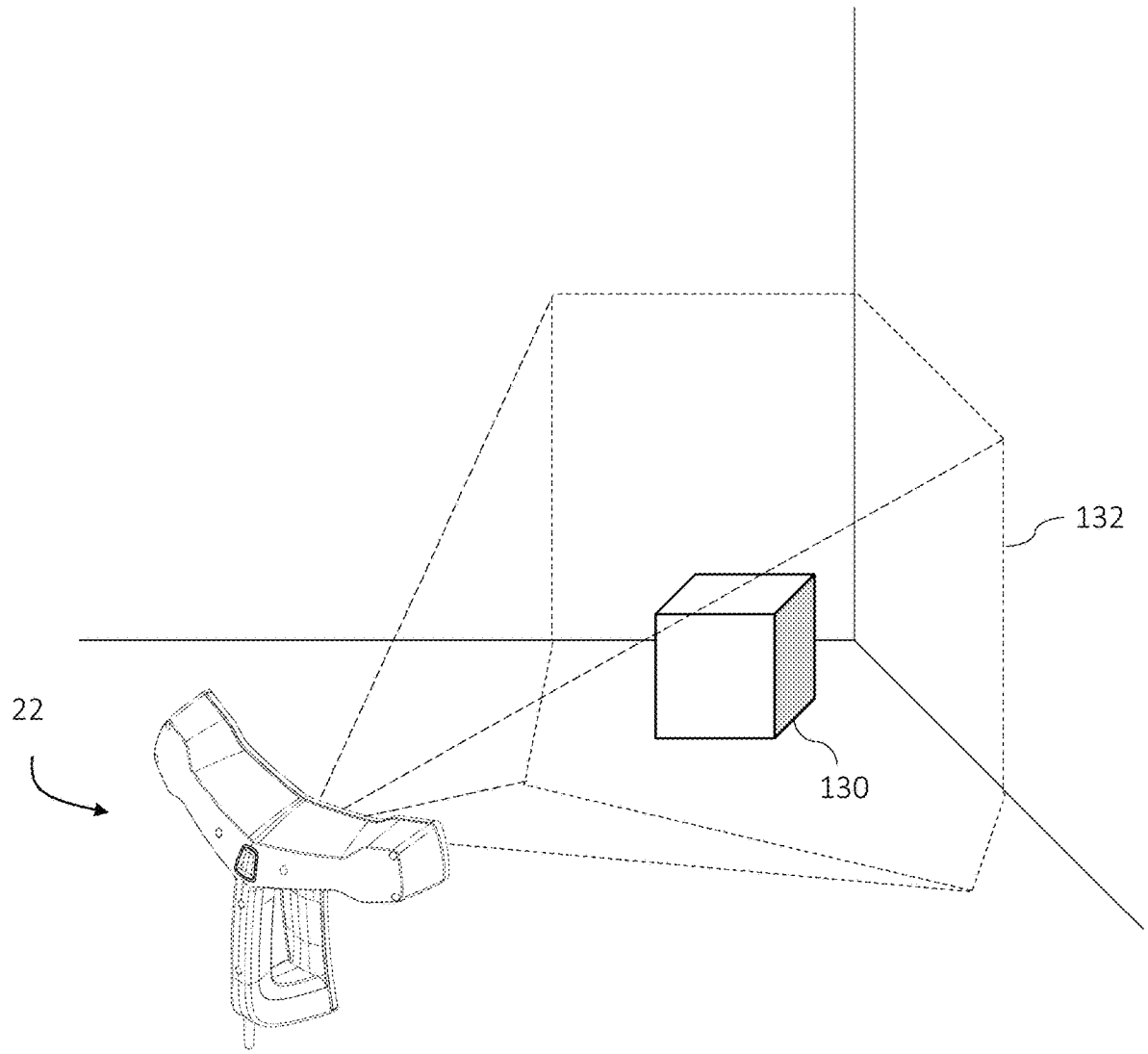
FIG. 4 is an illustration of a 3D imager acquiring scanning an object to obtain 3D coordinates of the object in accordance with an embodiment.
Figure 5:
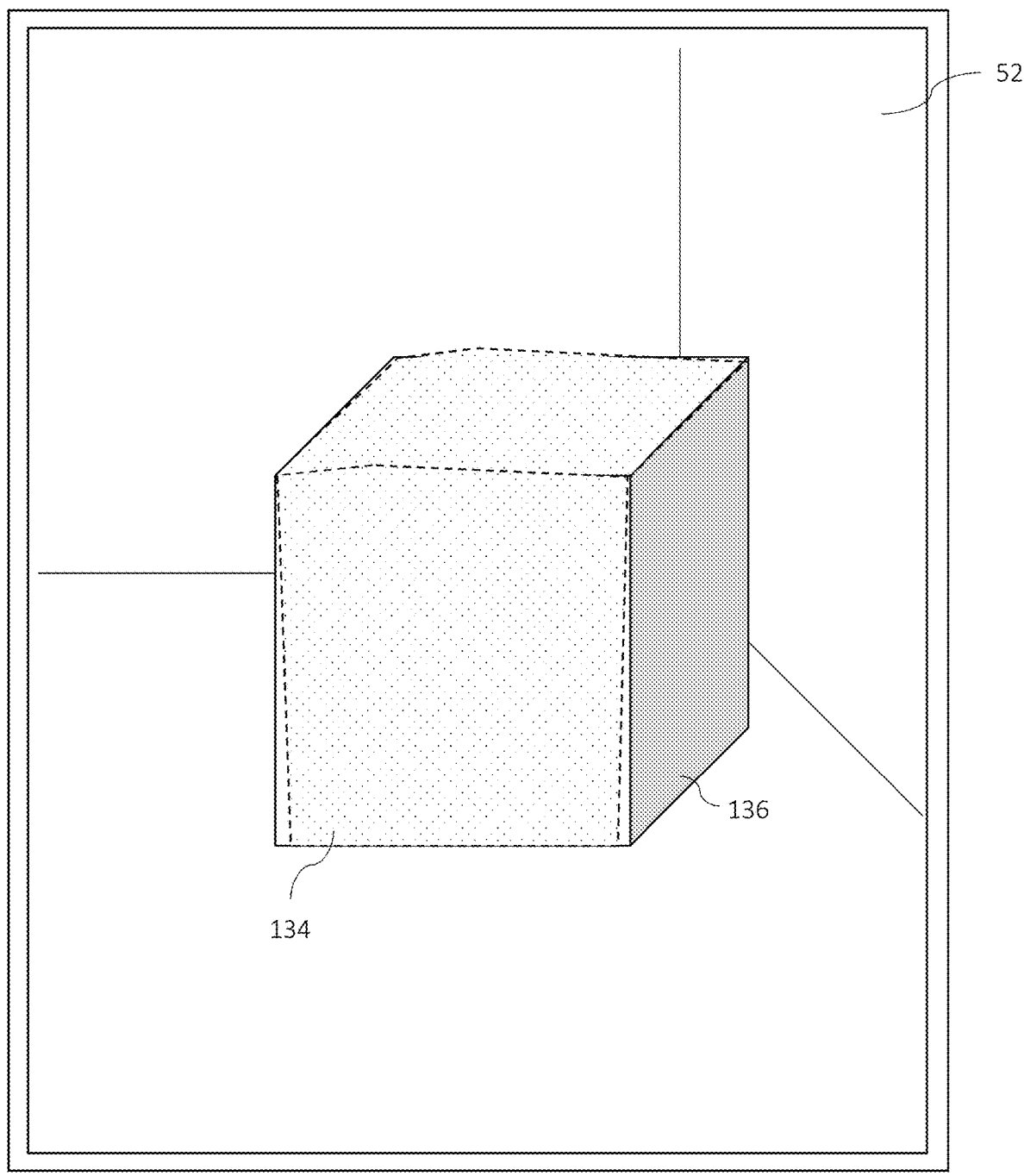
FIG. 5 is an illustration of a user interface coupled to a 3D imager in accordance with an embodiment.

Referring now to FIG. 4 and FIG. 5 an embodiment is shown of system 20 using an image scanner 22 to acquire 3D coordinates of points on the surface of an object 130. During operation, the operator then changes the position and pose of the image scanner 22 to place the object within the field of view 132 of the projector 24 and cameras 26, 28. The images from cameras 26, 28 are transmitted to the controller 48 and the 3D coordinates of the points on object 130 are determined. 3D coordinates from multiple images are registered together into a common frame of reference and displayed as a point cloud 134 on the user interface 52. It should be appreciated that the display of the point cloud is updated as the scanning operation is being performed to allow the operator to visualize the scanned data.

In an embodiment, the operator receive an electronic model of the object 130 being scanned. In an embodiment, the electronic model may be a computer-aided-design (CAD) model. The electronic model may be received from a remote computer 47 or from a remotely connected database 51. In an embodiment, the controller 48 aligns the electronic model 136 with the point cloud 134 overlays an image of the electronic model 136 on the user interface 52. This allows the operator to visually compare the point cloud 134 against the electronic model to generate an augmented reality image of the scene being scanned as shown in FIG. 5

Figure 6:
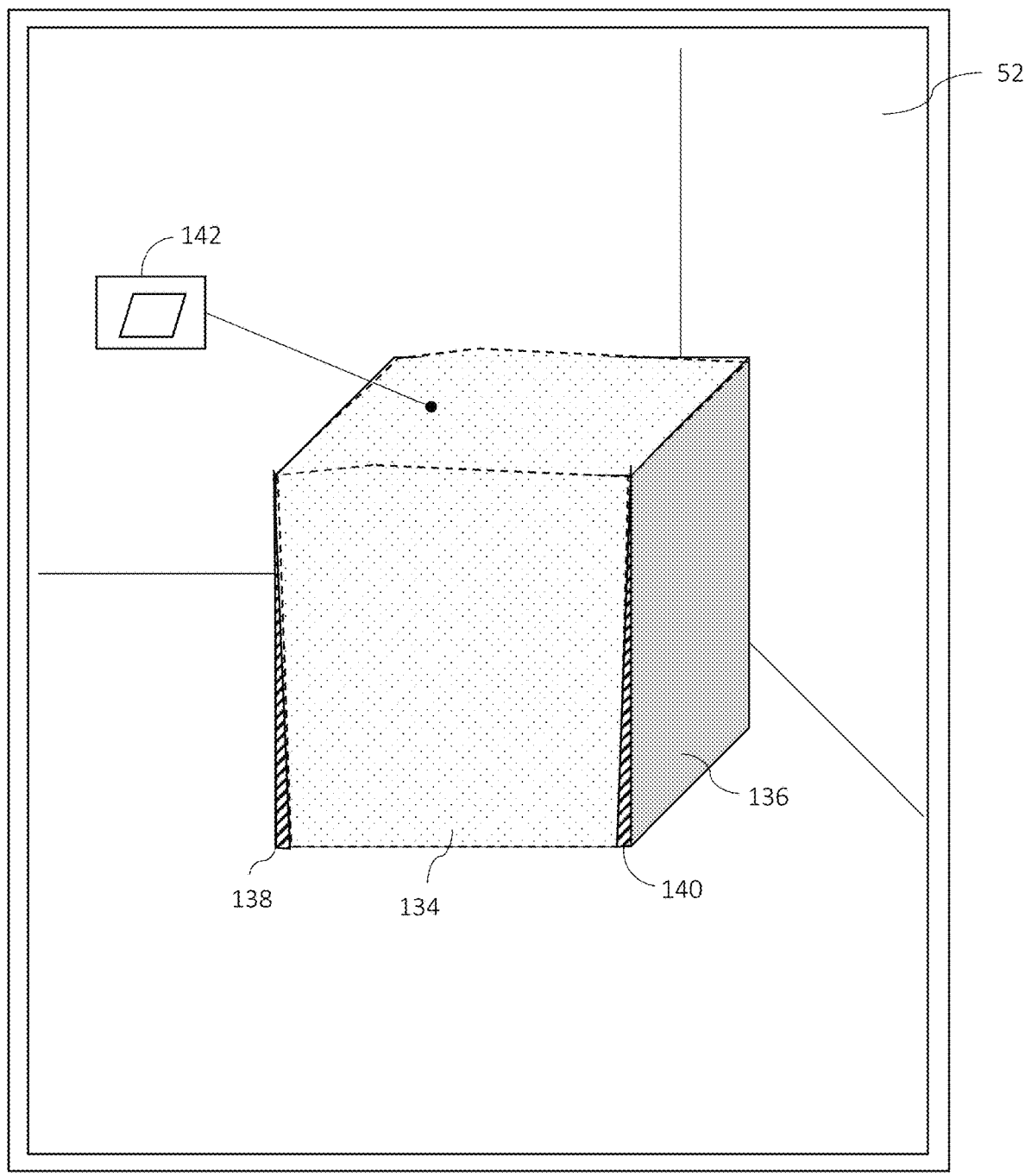
FIG. 6 is an illustration of the user interface of FIG. 5 with an electronic model overlaid on a point cloud in accordance with an embodiment.

In an embodiment, once the point cloud 134 is aligned the controller 48 compares the point cloud data 134 to the electronic model 136 to determine if dimensions of the object 130 (as represented by the point cloud 134) are out of variance with predetermined tolerances. As shown in FIG. 6, indicators 138, 140, 142 are displayed on the user interface 52 to allow the operator to visualize where the object 130 may be out of specification. These variances may include dimensions 138, 140 that are out of specification, or geometric dimensions and tolerance (GD&T) 142, such as flatness for example. In an embodiment the variances are defined within the electronic model. In another embodiment, the variances are defined by the operator on controller 48. In an embodiment, the second projector 25 (FIG. 1) emits a light onto the locations where such variances are located.

Figure 7:
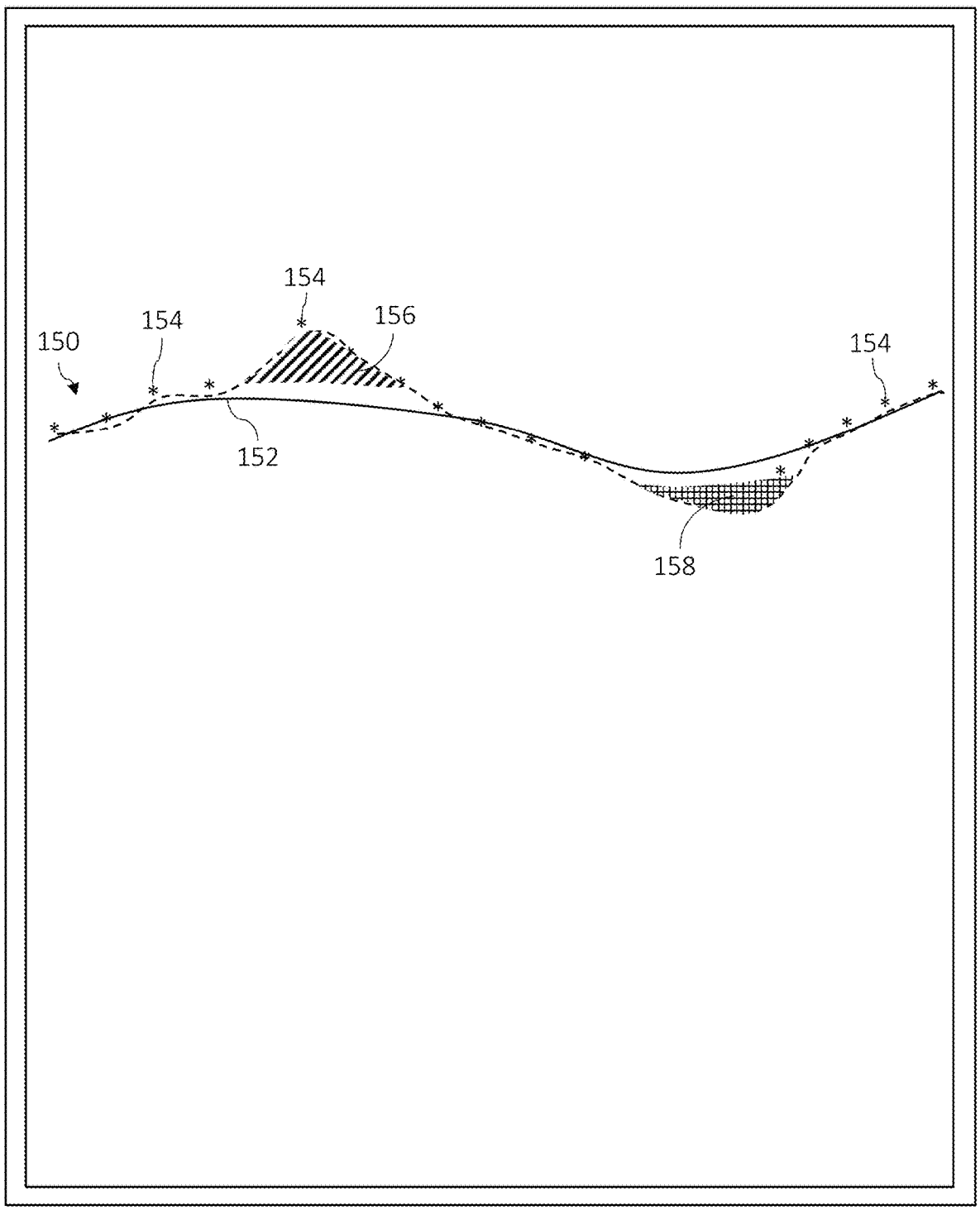
FIG. 7 is an illustration of the user interface of FIG. 5 with indicators showing the locations of variance in accordance with an embodiment.

Referring now to FIG. 7, an embodiment is shown that illustrates the variances of a portion of a point cloud 150 relative to an electronic model 152 of a surface. It should be appreciated that while the embodiment of FIG. 7 illustrates the electronic model 152 and point cloud 150 in two-dimensions, this is for exemplary purposes and the following discussion applies also the three-dimensional electronic models and point clouds. In this embodiment, the point cloud 150 is comprised of a plurality of points 154 represented by an "*" in FIG. 7. The electronic model 152 is represented as a line or an edge. It should be appreciated that except in unusual circumstances, some or most of the points 154 in the point cloud 150 will be offset from an edge or surface of the electronic model 152 due to variations in manufacturing/fabrication. It should be appreciated that in applications where the object, such as object 130 for example, is being inspected to determine if the object was fabricated within desired specifications, the operator or designer may have assigned tolerances to the dimensions or features of the object. When a dimension or feature is outside of the tolerance, the object has a variance. In some embodiments, the electronic model 152 may include different areas or portions that include or are assigned different tolerances than other areas or portions. These different areas or portions may be registered to the point cloud 150 with the goal to achieve improved alignment accuracy and to allow different variances to be displayed as shown in FIG. 6.

In an embodiment, the controller 48 compares the electronic model 152 to the point cloud 150 and automatically identifies variances. In response to the identification of the variance, an indicator, such as indicators 156, 158 for example, may be displayed on the user interface 52 to provide a visual indication to the operator. In an embodiment, this comparison and display of indicators occurs during the process of measuring or scanning the object. Thus, the operator is able to determine what, if any, variances are present in the object prior to completing the measurement process. Therefore, in some embodiments an advantage is provided that allows the operator to take remedial steps to address the variation earlier in the process than was possible in prior art measurement systems. In some embodiments, the comparison and visual indication is performed in real-time or near real-time with the measurement of the object.

Figure 8:
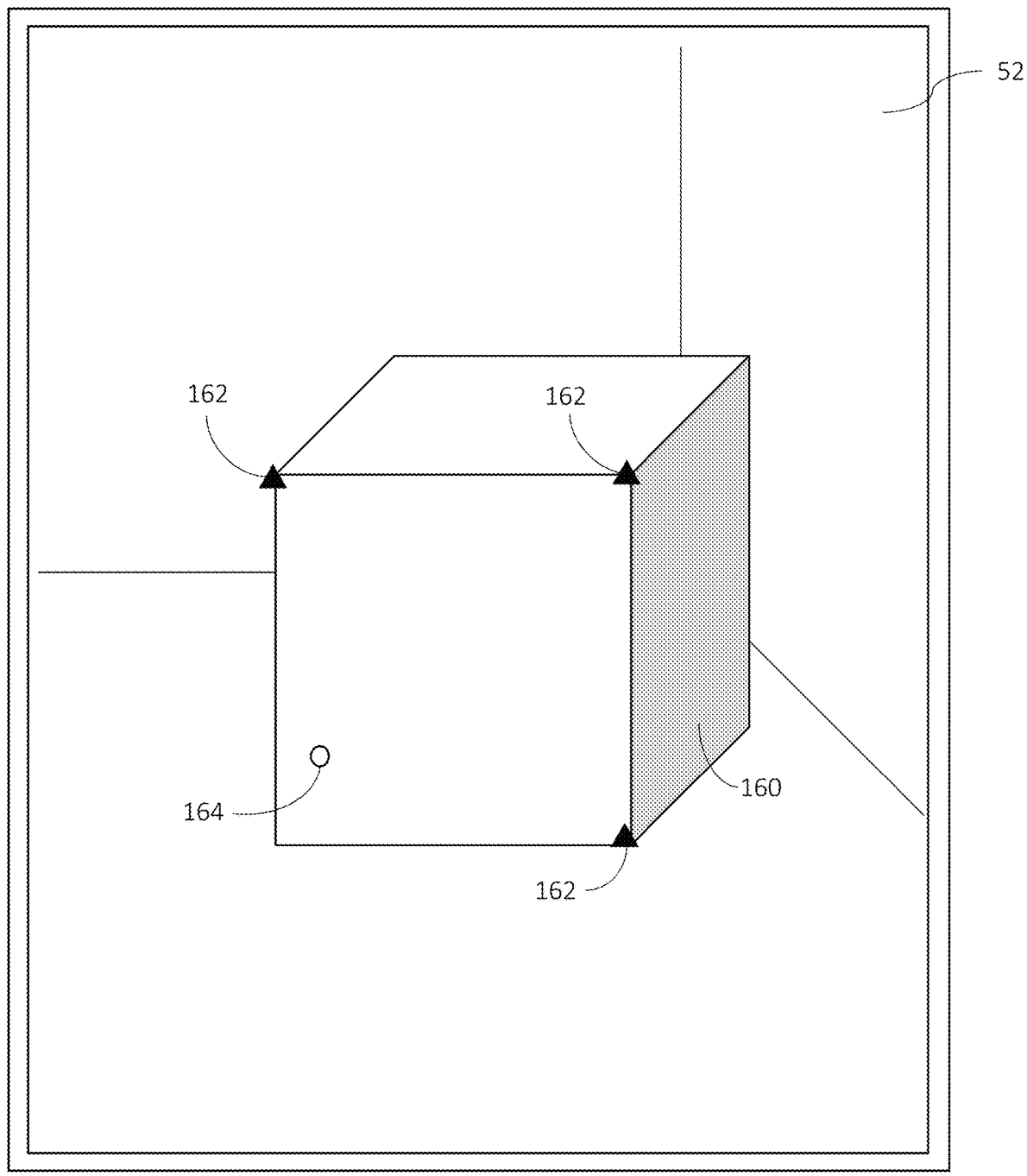
FIG. 8 is an illustration of the user interface of FIG. 5 with an electronic model having markers in accordance with an embodiment.
Figure 9:
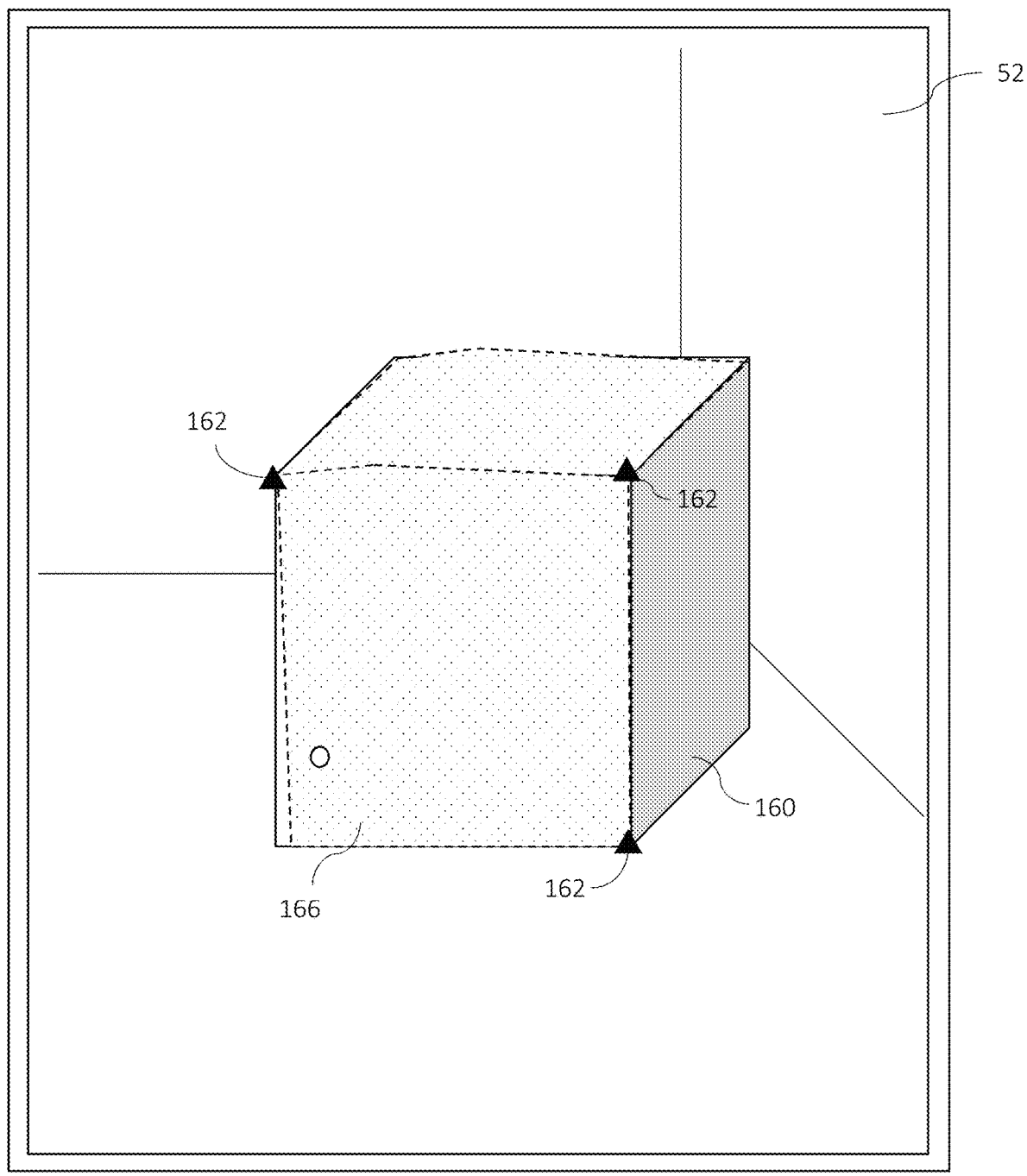
FIG. 9 is an illustration oft user interface of FIG. 5 with a point cloud overlaid on the electronic model accordance with another embodiment.

Referring now to FIG. 8, an embodiment is shown of another method of aligning the electronic model to the point cloud. In this embodiment, the operator receives the electronic model 160, such as from remote database 51 for example, and displays it on the user interface 52. The operator may then associate markers 162 with features on the electronic module, such as corners or drill holes 164 for example. In an embodiment, the operator defines and associates markers 162 with at least three features. It should be appreciated that in other embodiments, if more complex features are identified, such as a planar portion of a surface for example, then less point locations may be associated with markers. During operation, as the point cloud 166 is generated, the points associated with the marked features are identified. Once identified, they may be used to align the electronic model 160 as shown in FIG. 9.

Figure 10:
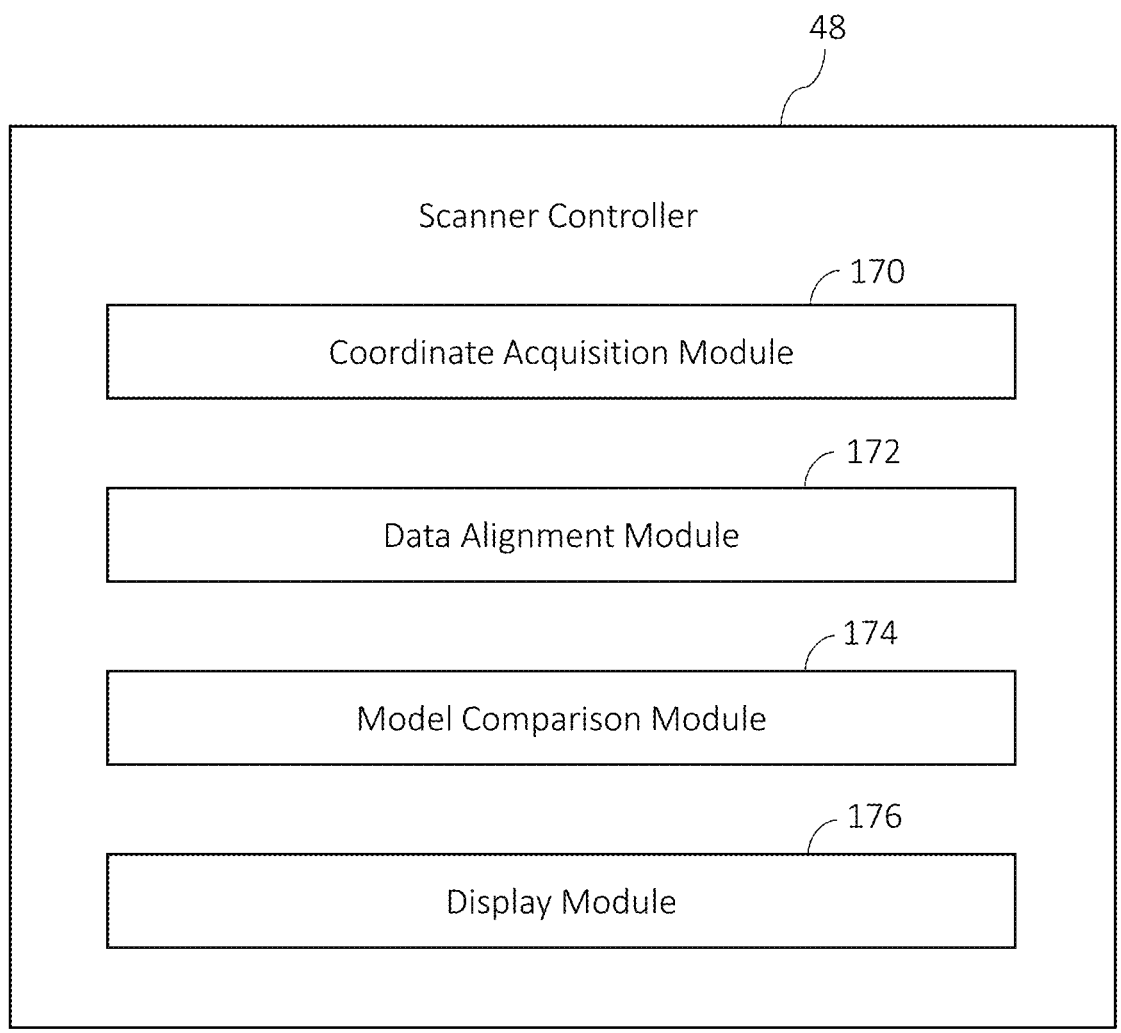
FIG. 10 is a schematic illustration of a controller for the 3D imager of FIG. 1 in accordance with an embodiment.

Referring now to FIG. 10, a schematic diagram is shown of the main application function models of the scanner controller 48. In an embodiment the scanner controller 48 includes a plurality of detection modules or engines for identifying defects or variations in measured objects. The detection modules may be embodied in the form of application software, field-gate programmable arrays (FPGA), analog circuits, digital circuits or a combination of the foregoing. In an embodiment the controller 48 includes a coordinate acquisition module 170, a data alignment module 172, a model comparison module 174, and a display module 176. The coordinate acquisition module 170 is used for acquiring point cloud data using the image scanner 22 and acquiring an electronic model of the object being scanned, such as from remote computer 47 or database 51 for example. The data alignment module 172 is used for identifying common features (or marker locations) between the point cloud and the electronic model. The data alignment module 172 reorients the electronic model relative to the point cloud such that the electronic module overlaps or overlays the point cloud in a common frame of reference. The model comparison module 174 is used to determine or identify the presence of variances, based on predetermined tolerances or thresholds, between the electronic module and the point cloud. The variances may be determined in three-dimensional space in the common frame of reference (e.g. Cartesian or x, y, z, coordinates). The display module 176 receives the aligned point cloud and electronic models from the data alignment module 172 displays them on the user interface 52. The display module 176 further receives the locations and types of variances identified by the model comparison module 174 and displays indicators of the variances on the user interface 52.

Referring now to FIG. 11 a flow diagram is shown of a method 180 for inspecting an object. It should be appreciated that while FIG. 11 shows the steps as being performed in a sequential manner, this is for exemplary purposes and the claims should not be so limited. It should be appreciated that the steps associated with different modules 170, 172, 174, 176 may also be executed in parallel. The method 180 begins in block 182 where the area or object of interest is measured. In the embodiments of FIG. 4, this may include using the system 20 to measure points on an object by emitting a light pattern and acquiring images of the light pattern on one or more surfaces of the object.

The method 180 then proceeds to block 184 where the 3D coordinates of the points on the surface are determined and the point cloud generated. In some embodiments, this may include acquiring one or more color images that are used for registration sequentially acquired scans as described herein. The method 180 then proceeds to block 186 where the method 180 bifurcates into multiple processes.

It should be appreciated that the steps of blocks 182, 184 may be performed by the coordinate acquisition module 170. In an embodiment, one portion of the method 180 continues to query block 188 where it is determined whether the operator wishes to continue. If query block 188 returns a positive, the method 180 loops back to block 182 and the measurement continues. If query block 188 returns a negative, the method 180 stops in block 190.

In an embodiment, while the steps of blocks 182-190 are performed by the coordinate acquisition module 170, a second portion of the method 180 is performed simultaneously or in parallel. The method first proceeds to block 192 which aligns the electronic model with the point cloud generated in block 184. The electronic record is received from block 194. In an embodiment, these steps are performed by data alignment module 172.

With the electronic model aligned with the point cloud, the method 180 proceeds to query block 196 where it is determined if there is a variance outside of a predetermined threshold or tolerance between the electronic model and the point cloud. When query block 196 returns a negative, the method 180 loops back to block 192 and the determines whether there is new point cloud data (from the measurement process of coordinate acquisition module 170) and the process continues. If the query block 196 returns a positive, the method 180 proceeds to block 198 where an indicator of the variance is displayed on the user interface 52. In an embodiment, the comparison of the electronic model to the point cloud causes a quality report to be generated that indicates both the positive (e.g. within tolerance) and negative (e.g. a variance) measurements or indicators. As used herein, a quality report may be a compilation of data in a standardized or semi-standardized electronic or paper format that allows the operator to quickly determine the quality state of the object, store results for later analysis, or confirmation of the dimensions of the object.

It should be appreciated that steps 192-198 will be performed in parallel with and as long as the measurement of the object is performed. Further, in some embodiments, block 198 further includes the step of adjusting the object to reduce, remove or eliminate the variance. In an embodiment, the object may be modifiable, such as for example it is made from a material that is not yet hardened, adjustable by rotation of fasteners (e.g. screws), or an adhesive or glue is not yet fully cured. In these embodiments, when the variance is displayed, the operator may adjust or modify the object to reduce, remove or eliminate the variance. In one embodiment, the controller 48 may display instructions to the operator on steps that may be performed on the object by the operator to reduce, remove or eliminate the variance.

Technical effects and benefits of some embodiments include the measurement of three-dimensional coordinates of points on a surface and the automatic determination of variances from a predetermined model during the measurement process on the measurement device itself without the use of post processing or auxiliary computer services.

The term "about" is intended to include the degree of error associated with measurement of the particular quantity based upon the equipment available at the time of filing the application. For example, "about" can include a range of ±8% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system for inspecting an object, the system comprising:
   a measurement device operable to measure three dimensional coordinates of one or more points on a surface of the object;
   a display operably coupled to the measurement device, the display being sized to be carried by an operator with the measurement device;
   one or more processors operably coupled to the measurement device, the one or more processors operable to execute computer instructions when executed on the one or more processors to perform a method comprising:
   determining three-dimensional coordinates of the one or more points while the object is being measured;
   aligning an electronic model of the object to the one or more points while the object is being measured;
   determining a variance between the electronic model and the one or more points while the object is being measured; and
   displaying on the display an indicator when the variance exceeds a threshold while the object is being measured, wherein the displaying of the indicator is executed simultaneously with the measuring the three dimensional coordinates of the one or more points.

2. The system of claim 1, wherein the measurement device is a noncontact measurement device.

3. The system of claim 2, wherein the noncontact measurement device is a laser tracker, an area scanner, or a laser line probe.

4. The system of claim 1, wherein the measurement device is an articulated arm coordinate measurement machine (AACMM).

5. The system of claim 1, wherein the method further comprises:
   displaying the electronic model on the display;
   associating one or more markers with points on the electronic model in response to an input from the operator; and
   wherein the aligning is based at least in part on the one or more markers.

6. The system of claim 1, wherein the measurement device is a noncontact measurement device comprising:
   a projector that emits a first light and a second light, the second light being a different wavelength than the first light, a wavelength of the second light being in a visible light spectrum;
   a measurement camera operably coupled to the noncontact measurement device; and
   wherein the determining the three-dimensional coordinates is based at least in part on the first light and an image acquired by the measurement camera.

7. The system of claim 6, wherein the method further comprises projecting the second light onto at least one point on the surface, wherein the at least one point is a location where the variance between the electronic model and the location is greater than the threshold.

8. The system of claim 1, wherein the electronic model is a computer-aided-design (CAD) model.

9. A method comprising:
measuring locations of one or more points on a surface of an object with a measurement device;
determining the three-dimensional coordinates of the one or more points with the measurement device;
receiving an electronic model of the object with the measurement device;
aligning, with the measurement device, the electronic model of the object to the one or more points while the object is being measured;
determining, with the measurement device, a variance between the electronic model and the one or more points while the object is being measured; and
displaying on a display an indicator when the variance exceeds a threshold while the object is being measured,
wherein the displaying of the indicator is performed simultaneously with the measuring locations of the one or more points.

10. The method of claim 9, further comprising:
displaying the electronic model on the display;
associating one or more markers with points on the electronic model in response to an input from an operator; and
wherein the aligning is based at least in part on the one or more markers.

11. The method of claim 10, further comprising:
emitting a first light from a projector onto the surface, the projector being operably coupled to the measurement device;
acquiring an image of the first light on the surface with a measurement camera operably coupled to the measurement device; and
wherein the determining the three-dimensional coordinates is based at least in part on the first light and the image.

12. The method of claim 11, further comprising:
emitting a second light from the projector onto at least one point on the surface, the second light being a different wavelength than the first light, a wavelength of the second light being in a visible light spectrum; and
wherein the at least one point is at a location where the variance between the electronic model and the location is greater than the threshold.

13. The method of claim 9, wherein the measurement device is an articulated arm coordinate measurement machine (AACMM).

14. The method of claim 9, wherein the measurement device is a noncontact measurement device.

15. The method of claim 14, wherein the noncontact measurement device is a laser tracker, an area scanner, or a laser line probe.

16. The method of claim 9, further comprising adjusting or modifying the object by an operator to reduce or remove the variance.

17. The method of claim 16, further comprising displaying on the display at least one instruction to the operator of a means for reducing or removing the variance.

18. The method of claim 9, wherein the display is wearable on an operator's head.

19. The method of claim 18, wherein the wearable display is incorporated into glasses.

20. The method of claim 9, wherein the threshold varies depending on an area of the electronic model.

* * * * *